| United States Patent [19] | [11] | 4,297,130 |
|---|---|---|
| Moore, Jr. | [45] | Oct. 27, 1981 |

[54] METHOD FOR INCREASING THE NUMBER OF PODS IN LEGUMES BY FOLIAR FEEDING

[76] Inventor: William P. Moore, Jr., P.O. Box 943, Hopewell, Va. 23860

[21] Appl. No.: 50,047

[22] Filed: Jun. 19, 1979

Related U.S. Application Data

[63] Continuation-in-part of Ser. No. 829,140, Aug. 30, 1977, abandoned.

[51] Int. Cl.$^3$ .......................... A01N 47/28; C05C 9/00
[52] U.S. Cl. .......................................... 71/119; 71/65; 71/28
[58] Field of Search ............................. 71/65, 119, 28

[56] References Cited

U.S. PATENT DOCUMENTS

| 4,033,745 | 7/1977 | Moore, Jr. | 71/28 |
| 4,145,207 | 3/1979 | Moore | 71/28 |

FOREIGN PATENT DOCUMENTS 737468  9/1955  United Kingdom .

Primary Examiner—Catherine L. Mills

[57] ABSTRACT

Method for the foliar feeding of leguminous plants wherein a nonburning nitrogenous plant food is applied to the foliage of the plant at a critical life-cycle period to increase substantially the quantity and to enhance the quality of seeds produced therefrom.

6 Claims, No Drawings

METHOD FOR INCREASING THE NUMBER OF PODS IN LEGUMES BY FOLIAR FEEDING

CROSS REFERENCE TO RELATED APPLICATION

This application is a continuation-in-part of application Ser. No. 829,140 filed Aug. 30, 1977, abandoned.

BACKGROUND OF THE INVENTION

1. Field of the Invention

This invention relates to method for fertilizing leguminous plants.

2. Description of the Prior Art

Leguminous plants are characterized by their ability to fix nitrogen microbially from the atmosphere, usually in nodules connected with their root systems, and their ability to use the fixed nitrogen to produce proteinaceous seeds. The commercial products from leguminous plants are, in the main, seeds enclosed in true pods which are generated from the plants' flowers. Less than 10% of the flowers of the plant are normally converted to seed pods. Most flowers are aborted because of the inability of the plant to supply the nutrients required during period of stress when flowers are converted to mature seed pods among other reasons. Legumes constitute some of the world's most important agricultural crops; e.g., peas, beans, soybeans and peanuts.

Recent investigations have reported that foliar feeding of leguminous plants with liquid plant foods, when carefully applied, produces an increase in seed yields. Single or multiple applications of small amounts of aqueous plant foods containing urea, potassium polyphosphate and potassium sulfate have been purported to increase soybean yields significantly. Practical results, however, have been erratic and frequently poor because of foilage burn.

A number of chemical compositions containing water-insoluble nitrogen have been used as soil fertilizers to take advantage of the extended period of nitrogen release for the feeding of the root systems of plants. Some of the chemicals, previously reported for slow release of nitrogen for root fertilization include: isobutyl diurea, melamine, oxamide, urea-formaldehyde polymers, and others. Legume bearing plants fertilized with the foregoing compositions exhibit growth stimulation but improvement in pod production is not significant.

SUMMARY OF THE INVENTION

In accordance with the present invention formation of legume seed pods can be substantially increased by the application of a non-burning, nitrogenous plant food to the foliage of the leguminous plant during the flowering period. The amount of nitrogen applied in this manner is from about 0.3 to 2.0 percent based on the average weight yield of mature seeds obtained without applied fertilization. In addition to increasing seed pods, the practice of the invention results in the production of seeds of superior quality from the standpoint of yielding larger seeds having a higher proteinaceous content.

DESCRIPTION OF THE PREFERRED EMBODIMENTS

Essential to the practice of this invention is the use of a foliar plant food whose nitrogen content is assimilated by the foliage of plants at a rate or in a manner which does not burn or otherwise cause damage to the plant. Nitrogen can only be assimilated by a plant when in the form of a water-soluble compound. Accordingly, an effective foliar plant food in the context of this invention is principally composed of two components. One of these components is in the form of water-soluble organic nitrogen compounds so as to permit the feeding process to commence substantially immediately upon contact with the plant foliage. The other component is in the form of water-insoluble organic nitrogen compounds capable of progressively degrading to water soluble compounds under the influence of the urease and other enzymes and microbes present on the foliage.

Plant foods of the aforesaid type useful herein contain from about 25–50% of the total nitrogen content in the form of water soluble compounds and correspondingly from about 75–50% in the form of water-insoluble compounds. Water-soluble nitrogen in excess of the maximum indicated presents the hazard of foliage burn whereas a food containing less than about 25% of water-soluble nitrogen fails to promote flower conversion to pods to the optimum extent obtainable. Inorganic water soluble compounds can be used if present in a sparing amount so as to provide preferably not in excess of 10% of the total nitrogen content of the foliar feed.

Concentration of total nitrogen in the aqueous plant foods contemplated herein ranges from about 5–30% and more preferably in the order of from about 15–30%. While nitrogen serves as the primary nutrient in the practice of this invention, other nutrients such as potassium and phosphorous can optionally be employed in supplemental amounts. Particularly suitable sources of secondary nutrients are such as potassium phosphate and potassium polyphosphates. The phosphorous and potassium contents of foliar plant foods, when present, are customarily expressed in terms of an equivalent $P_2O_5$ and $K_2O$ content, respectively. On this basis, phosphorous is ordinarily used not in excess of about 5% and generally from about 3–5% potassium is included in essentially the same amount. When present in about the indicated amounts, these secondary nutrients do not result in foliage damage.

As pointed out previously, the applicable plant foods consists essentially of a combination of water-soluble and water-insoluble organic nitrogeneous compounds. Illustrative of water soluble compounds are such as urea, the lower methylene ureas; e.g., methylene diurea, dimethylene triurea and trimethylene tetraurea, and the lower methylol ureas obtained by condensing urea with formaldehyde under appropriate processing conditions.

Representative water-insoluble nitrogen compounds include: isobutyl diurea, melamine, oxamide, the higher methylol urea condensates, and the higher methylene ureas such as trimethylene pentaurea and tetramethylene hexaurea.

The applicable plant foods can be conveniently prepared by blending the respective components to provide a composition conforming to the relative ratios hereinabove set forth. For economic considerations, however, an in situ method is preferred for preparing an applicable plant food whereby urea is condensed with formaldehyde under certain controlled conditions to provide a reaction product having the requisite contents of water-soluble and water-insoluble compounds. Irrespective of the manner utilized in obtaining the plant food, the water-insoluble compounds desirably have a particle size of not in excess of 0.1 mm and more preferably in the order of 0.01 mm or less. Larger size particles than the maximum indicated decompose slower than desired, cause spraying difficulties, and are prone to wash off the foliage before the plant can assimilate the available nitrogen to any significant extent.

A variety of in situ methods can be implemented in obtaining a foliar plant food useful herein. In one method urea is condensed with formaldehyde to provide a product wherein unreacted urea and the lower methylol derivatives constitute the water-soluble component and the higher methylol derivatives formed serve as the water-insoluble slow release source of nitrogen. A representative method of this type will be exemplified in the working examples presented hereinbelow. Additionally, the use of a product of the foregoing type which is commercially available in the form of a solid fertilizer composition will likewise be illustrated.

A singularly effective plant food for use in accordance with this invention is a commercially available clear aqueous concentrate of a ureaformaldehyde condensate containing about 26% nitrogen. The unique characteristic of this product is that it exhibits extended storage stability and yet upon application to the foliage of a plant or contact with the soil polymerization proceeds to occur thereby converting a proportion of the total nitrogen content to a water-insoluble form. The identity of the foregoing product and its use to fertilize a peanut crop in accordance with the present invention will be set forth in the examples to follow.

EXAMPLE I

To a jacketed reactor equipped with a stirrer and internal cooling coils were charged 4000 kg. aqueous formaldehyde (50%), 11800 kg. water and 6000 kg. urea (46% N).

The mixture was heated until all the urea was completely dissolved and heating was continued until the temperature reached 82° C. The pH of the solution was then adjusted to 3.5 by addition of 9 kg. of aqueous 25% formic acid. The temperature increased slightly to 85° C. and cooling water was applied to maintain the temperature for 45 minutes with constant stirring. At the end of this reaction period, the reaction mixture had a creamy appearance, and it was neutralized to pH 6.6 by the addition of 34 kilograms of triethanolamine and cooled to ambient temperature in 30 minutes. To the cooled mixture were added 680 kg. molasses, 37.5 kg. methanol and 170 kg. attapulgite clay. The mixture was then circulated through a high shear centrifugal pump for 30 minutes to gel the clay and to complete the blending of the added ingredients. A sample was withdrawn from the mixture and analysis for total nitrogen and water insoluble nitrogen showed 12.2% and 8.7%, respectively, indicating 71.3% of the nitrogen was water-insoluble.

EXAMPLE II

A field of English Peas in Delaware was estimated to yield, at harvest, about 570 kg. of peas per acre based on the stand of the legume plants and previous performance of the species in the area. Spraying of the suspension of 12-0-0 foliar feed of Example I was accomplished with a motorized back pack Stihl atomizer-blower, which produced a fine spray of foliar feed droplets uniformly less than 0.1 mm in diameter. Application was made at early flowering stage when flowers were still starting to form and at late flowering stage when some pods were starting to form. Comparisons were made of pod count of check plots and plots treated at early and late flowering stage. The results obtained are tabulated as follows:

TABLE II

| Plot No. | Blossom Stage at Application | Foliar Feed Application Rate Kg./acre | Average Pea Pod Per Test Count | Variation from Check % |
|---|---|---|---|---|
| 1 | Late | 100 | 58 | + 38 |
| 2 | Late | 0 Check | 42 | — |
| 3 | Early | 200 | 58 | + 29 |
| 4 | Early | 100 | 53 | + 18 |
| 5 | Early | 0 Check | 45 | — |

As shown, the number of pea pods were significantly increased by the foliar treatment of the English Peas and that the treatment during the later part of the flowering stage produced a larger increase than the early flowering stage treatment. There was no evidence of foliar damage or burn from the foliar feed.

EXAMPLE III

To the urea-formaldehyde condensate suspension of Example I, was added potassium phosphate (containing 60% of the phosphate in the polyphosphate form) and water to produce a liquid suspension analyzing 10-3-3. A field of soybeans in Central Ohio was selected for foliar application. Based on the stand and previous years experience, anticipated seed yield was estimated to be 1090 kg. The above foliar feed suspension was applied by helicopter at the midbloom stage, and average droplet size was less than 0.1 mm in diameter as determined from test papers disposed in the treated area. Results obtained are tabulated as follows:

TABLE III

| Plot No. | Blossom Stage | Foliar Feed Application Kg./acre | Average Bean Pod Count per Plant | Soybean Yield Kg./acre |
|---|---|---|---|---|
| 1 | Middle | 115 | 81 | 1900 |
| 2 | Middle | Check | 45 | 980 |

These data demonstrated that the number of soybean pods increased significantly when the soybean plants were foliarly fed at mid-flowering and that a 94% increase in the final soybean yield harvested over the check was obtained, although no additional fertilization was made after the mid-flowering treatment.

EXAMPLE IV

Two additional foliar feed samples were prepared from solid compounds containing water insoluble nitrogen and having the same 10-3-3 analysis used in Example III and these samples were tested in the same Central Ohio field on soybeans as noted in the previous example. Each sample was ground in a high speed hammer mill, screened to pass through a Tyler 100 mesh screen and then blended at ambient temperature with potassium ortho-phosphate, water, attapulgite clay, and 80 Brix molasses to produce the desired 10-3-3 composition. The sources of water insoluble nitrogen were: Hercules Powder Blue Nitroform Urea-formaldehyde analyzing 38% total nitrogen, 68% of which was water insoluble; and IBDU (isobutyl diurea) with 74% water insoluble nitrogen.

The test suspensions were applied from a "High-Boy" tractor using high pressure flood-type nozzles. Check plots and a plot using water soluble foliar feed, analyzing 10-3-3 and composed of urea, potassium polyphosphate, and potassium sulfate, were also included in the test. A single application was made to the foliage at the mid-flowering stage of the soybean plants. The plot treated with the water soluble foliar feed suffered leaf burn within 24 hours of treatment and the treated area had an overall yellow-brown appearance. The areas treated with the water insoluble suspensions retained a white sprayed appearance until the foliage was lost from frost. Estimated soybean seed production for the field was 1090 kg. per acre and treatment in all tests was made at the level of 8 gm. nitrogen per kilogram of anticipated seed production. The results of the tests are tabulated below:

TABLE IV

| Plot No. | Nitrogen Source | % WIN | Soybean Yield Kg./acre | % Increase Over Check |
|---|---|---|---|---|
| 1 | Check | — | 980 | — |
| 2 | UF Polymer Powder Blue | 68 | 1635 | + 67 |
| 3 | IBDU | 74 | 1525 | + 55 |
| 4 | Urea | 0 | 850 | − 14 |

The yield increases experienced in this test were slightly lower than those obtained in Example III with the "in-situ" generated urea-formaldehyde polymers, probably because the solids contained some polymers formed in the drying process which are extremely resistant to microbial degradation. As shown, the foliage burn on the soluble urea tests depressed the soybean yields.

EXAMPLE V

A field of Essex soybeans in Central Virginia was divided into test plots and was treated with the 10-3-3 foliar feed of Example III, prior to flowering, at mid-flowering, and at pod filling stage when the pods were approximately one-third filled. The treatments were made using a back-pack motordriven Stihl atomizer-blower which produced very fine drops. Pod counts were made and yields were obtained by hand-harvesting the crops after frost had dropped the leaves. Based on the stand and previous years experience the anticipated bean yield was 820 kilograms per acre. Application of the plant food was at a rate to provide 0.8% N based on said anticipated yield. The results of the experiments and average check are tabulated as follows:

TABLE V

| Plot No. | Time of Application | Average Bean Pod Count Per Plant | Soybean Yield Kg./acre | Per Cent Yield Increase Over Check |
|---|---|---|---|---|
| 1 | Check | 38 | 1980 | — |
| 2 | Before Flowering | 44 | 2200 | + 11 |
| 3 | Mid-flowering | 69 | 3850 | + 94 |
| 4 | Pod-filling | 42 | 2560 | + 29 |

Foliar treatment just before flowering caused the soybean plants to increase in growth rate significantly but did not substantially increase the number of bean pods formed, although some overall yield increase was obtained. Foliar treatment at the mid-flowering stage caused a dramatic increase in the conversion of flowers to seed pods and an increase in size of the individual beans as indicated by the 94% increase in bean yield. Treatment after the beanfilling process was under way still increased the yield of soybeans by increasing the size of the beans produced but did not have a large influence on the number of bean pods grown to maturity.

EXAMPLE VI

A field of Florigiant Peanuts in Central Virginia were treated with the foliar plant food of Example III. The anticipated production of peanuts was 1600 kilograms per acre and the field was treated at the rates of 0.1, 0.3, 1.0 and 2.0% nitrogen based on the estimated yield of peanuts. The foliar feed was applied by a hand-held high pressure atomizer to 0.01 acre plot at the late flowering stage when the peanut plants had begun to put pegs to the soil. The crop was carried to maturity, and the plants hand dug and the peanuts weighed. The results obtained are tabulated as follows:

TABLE VI

| Plot No. | Foliar Feed Application Rate Kg./acre | Peanut Yield Kg./acre | % Increase over Check |
|---|---|---|---|
| 1 | Check | 1685 | — |
| 2 | 16 | 1660 | − 2 |
| 3 | 48 | 2060 | + 22 |
| 4 | 160 | 2190 | + 30 |
| 5 | 320 | 2210 | + 31 |

EXAMPLE VII

Samples of the English Peas produced in Example II from the check plot and from the plot treated with the 12-0-0 plant food at late flowering stage, and samples of the soybeans produced in Example III from the check plot and from the plot treated with 10-3-3 plant food at mid-flowering stage were dried overnight in an oven at 80° C. and analyzed for total protein content. The results are tabulated as follows:

TABLE VII

| Sample No. | Type Legume | Amount of N gm./kg. est. Seed | Time of Application | Protein Content, % | Increase From Check, % |
|---|---|---|---|---|---|
| 1 | Peas | Check | — | 27.7 | — |
| 2 | Peas | 0.02 | Late Flowering | 31.1 | 12.3 |
| 3 | Soybean | Check | — | 41.9 | — |
| 4 | Soybean | 0.01 | Mid-flowering | 45.2 | 7.8 |

EXAMPLE VIII

In this example the foliar plant food utilized was a clear aqueous solution of urea-formaldehyde partial condensation product marketed under the trademark FORMALENE (Ashland Chemical Company) having an analysis of 26-0-0. The testing was conducted in a field of Florigiant peanuts in Central Virginia during the late flowering stage when "pegs" were starting to go from the plant into the soil. The application of the plant food was in the form of a fine spray which upon contact with the plants commenced to polymerize forming, for the most part, water-insoluble slow-releasing nitrogen compounds. Application rates observed in this test together with the results obtained are outlined as follows:

TABLE VIII

| Plot No. | Application Rate Kg./acre | Peanut Yield Kg./Acre | % Increase Over Check |
|---|---|---|---|
| 1 | Check | 1635 | — |
| 2 | 26 | 2160 | 32 |
| 3 | 52 | 2225 | 36 |
| 4 | 68 | 2245 | 37 |

What is claimed is:

1. A method for increasing the conversion of flowers of a leguminous plant to seed pods consisting of applying to the foliage of the plant during the flowering period an aqueous spray of a non-burning plant food comprising the condensation product of urea and formaldehyde composed of from 25–50% water-soluble nitrogenous compounds involving unreacted urea and correspondingly from 75–50% water-insoluble nitrogenous compounds capable of progressively degrading to water-soluble compounds under the influence of the urease and other enzymes and microbes present on the foliage.

2. A method for increasing the conversion of flowers of a leguminous plant to seed pods consisting of applying to the foliage of the plant during the flowering period an aqueous spray of a non-burning plant food comprising an aqueous solution of a urea-formaldehyde condensation product containing about 26% nitrogen content and characterized in further polymerizing upon contact with the plant foliage to form water-insoluble slow-releasing nitrogenous compounds.

3. The method in accordance with claim 1 wherein said aqueous spray contains from 5–30% by weight nitrogen.

4. The method in accordance with claim 3 wherein said aqueous spray contains from 15–30% by weight nitrogen.

5. The method in accordance with claim 1 or 2 wherein the leguminous plant is soy bean, peanut, bean or pea.

6. The method in accordance with claim 5 wherein said plant food is applied to provide from 0.3 to 2.0% nitrogen based on the anticipated weight of the mature legume seeds without applied fertilization.

* * * * *